Aug. 5, 1958 J. F. BYRD 2,846,514

MULTIPLE SOUND SOURCE SWITCHING SYSTEM

Filed March 22, 1954

INVENTOR.
JOHN F. BYRD
BY [signature]

ATTORNEY 2,846,514

MULTIPLE SOUND SOURCE SWITCHING SYSTEM

John F. Byrd, Ashland, N. J., assignor to Radio Corporation of America, a corporation of Delaware Application March 22, 1954, Serial No. 417,896

6 Claims. (Cl. 179—100.1)

This invention relates to a system for multiple switching of signal sources, and more particularly to a system for effecting the simultaneous changeover from one plurality of signal sources to a second plurality of signal sources and vice versa.

The use of multiple projectors in theaters for the exhibition of sound motion pictures is well-known. That is, when the projection of a film reel has been completed in one projector, a second projector is started to continue the projection of a picture story. Since there is a sound track on each film, the detected sound from each track is also switched between projectors at the same time the picture changeover is made. In the usual sound systems, a preamplifier is connected to the photoelectric cell which feeds a power amplifier connected to one or more loudspeakers behind a motion picture screen. In such single photographic track systems using a photocell, the level is sufficiently high to permit switching on the low impedance side of an interconnecting transformer, which is generally a 500 ohm line. With the introduction of magnetic sound tracks, particularly a sound picture print having four narrow magnetic sound tracks thereon, the level from each detecting magnetic soundhead is down approximately twenty to thirty decibels from the output of a photoelectric cell.

With such a low output from the detecting heads, the former systems of switching between projectors is too noisy for commercial use. Switching, however, could be done at the output of the preamplifiers, which is usually around zero decibels at a one milliwatt reference. Therefore, the present invention is directed to a system of simultaneously switching a plurality of magnetic reproduce heads in one projector to a similar plurality of detecting magnetic heads in a second projector. The new system of switching permits noiseless changeover in the low level lines, and is not limited by the amount of additional gain required in the preamplifiers. It permits the entire switching operation to be accomplished with a single knob control, while simultaneously muting the input to the power amplifiers before breaking the connections to the reproducing heads. The system also requires only one-half the number of preamplifiers which would be required if the switching were accomplished at the zero decibel level.

The principal object of the invention, therefore, is to facilitate the switching between one plurality of signal sources to a second plurality of signal sources.

Another object of the invention is to provide an improved switching system between one plurality of signal sources and another plurality of signal sources.

A further object of the invention is to provide an improved multiple switching system between a plurality of low level magnetic reproduce heads and another plurality of low level reproduce heads in the low level circuits from the heads.

The novel features which are believed to be characteristic of this invention, both as to the manner of its organization and the mode of its operation, will be better understood from the following description, when read in conjunction with the accompanying drawing, in which.

Figure 1:
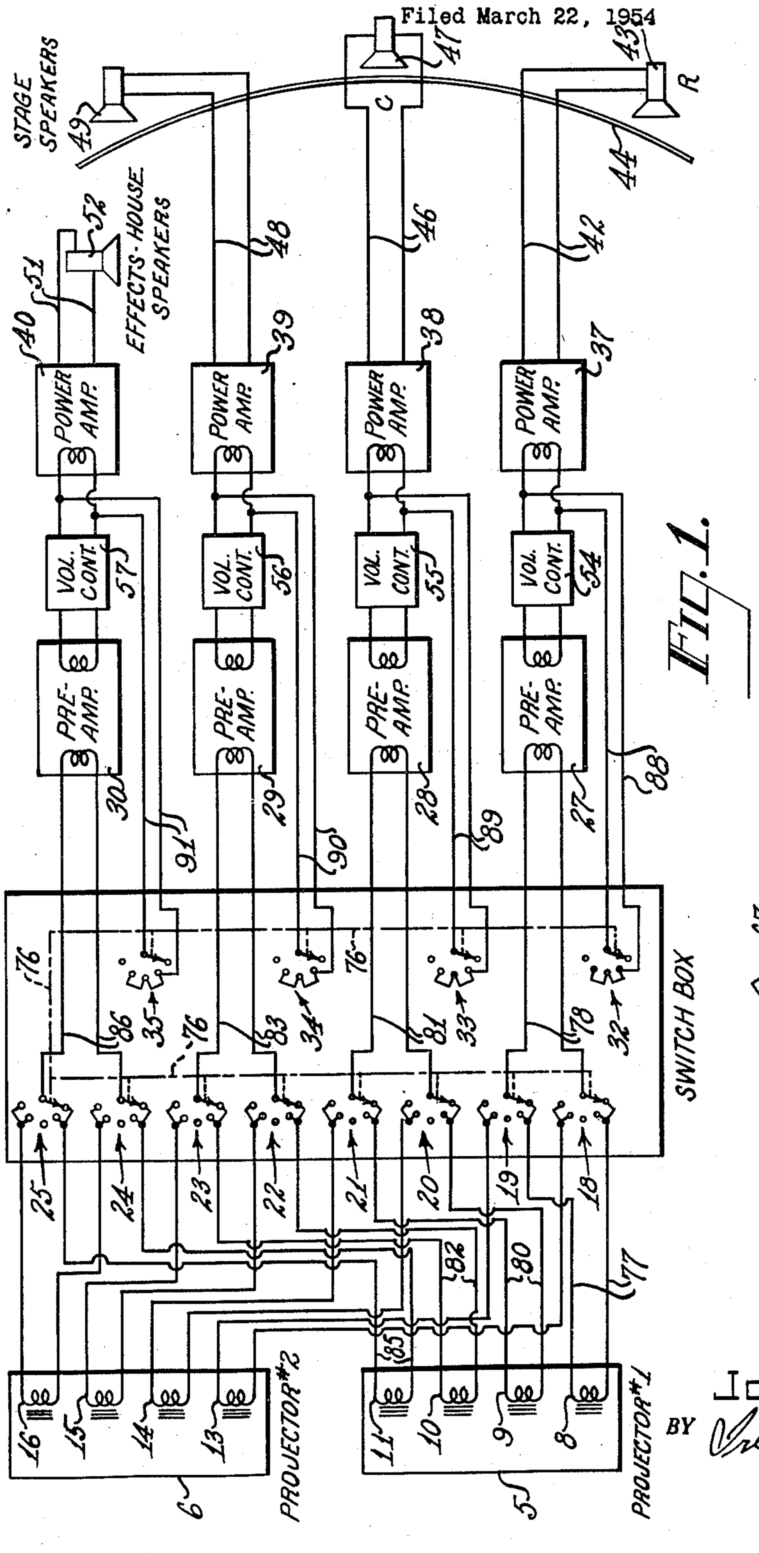
Fig. 1 is a combination schematic and diagrammatic view of a theater sound reproducing system embodying the invention.

Referring now to the drawings, in which the same numerals identify like elements, projector No. 1 is shown at 5 and projector No. 2 is shown at 6. Projector No. 1 is indicated as having four magnetic pickup heads 8, 9, 10, and 11, and projector No. 2 is indicated as having four magnetic pickup heads 13, 14, 15, and 16. The eight heads are connected to a switch box which is provided with eight switches 18, 19, 20, 21, 22, 23, 24, and 25 for connecting respective heads to four preamplifiers 27, 28, 29, and 30. Four other muting switches 32, 33, 34, and 35 are provided for short-circuiting the input to respective power amplifiers 37, 38, 39, and 40.

The power amplifier 37 is connected over conductors 42 to a loudspeaker 43 positioned behind the right side of a motion picture screen 44. The power amplifier 38 is connected over conductors 46 to a loudspeaker 47 positioned behind the central portion of motion picture screen 44. The power amplifier 39 is connected over conductors 48 to loudspeaker 49 positioned behind the left side of motion picture screen 44. The power amplifier 40 is connected over conductors 51 to a loudspeaker 52, which may represent several speakers positioned along the sides of the auditorium and/or in the rear thereof. For controlling the volume or level of the output to the respective speakers, respective volume control units 54, 55, 56, and 57 are provided.

Figure 2:
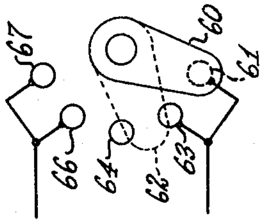
Fig. 2 is a detail view showing the operation of one of the switches embodied in the invention.

Although the swingers of the switches are shown as single lines in Fig. 1, these switches have flat leaf or brush type rotatable swingers of apreciable width so that the contact to which the swinger is rotated is made before the swinger leaves its previous contact. In other words, the switches are known as "make-before-break" type switches. As shown in Fig. 2, the swinger 60 is shown positioned on contact 61, while the dotted line position 62 of the swinger shows its spanning contacts 63 and 64. Thus, contact 64 will be made before contact 63 is broken. The switch shown in Fig. 2 has its contacts 61, 63, 64, 66, and 67 connected in the manner shown for the switches 18 to 25, inclusive, while the switch shown in Fig. 3, with its swinger 69 and contacts 70, 71, 72, 73, and 74, is wired in the same manner as switches 32, 33, 34, and 35 shown in Fig. 1.

To explain the operation of the switching system, Fig. 1 shows the four magnetic reproduce heads 8, 9, 10, and 11 of projector No. 1 connected to the four respective preamplifiers 27, 28, 29, and 30. The positions of switches 32, 33, 34, and 35 are such that the inputs of power amplifiers 37, 38, 39, and 40 are not short-circuited. The swingers of all the switches shown in the switch box are interconnected, as shown by the dot and dash lines 76.

Referring to the individual connections, magnetic reproduce head 8 is connected over conductors 77 to the first two contacts of switches 18 and 19, and then over conductors 78 to preamplifier 27. The magnetic head 9 is connected over conductors 80 to the first two contacts of switches 20 and 21, and then over conductors 81 to preamplifier 28. The magnetic reproduce head 10 is connected over conductors 82 to the first two contacts of switches 22 and 23, and then over conductors 83 to preamplifier 29. The magnetic pickup head 11 is connected over conductors 85 to the first two contacts of switches 24 and 25, and then over conductors 86 to preamplifier 30.

Now, when it is desired to switch from projector No. 1 to projector No. 2, the first positions to which the switches are shifted short-circuit the input to power amplifiers 37, 38, 39, and 40 by short-circuiting conductors 88, 89, 90, and 91. In these first switch positions, the swingers of switches 18 to 25, inclusive, still maintain their circuits. However, the next two positions of the switches will still maintain the inputs to the power amplifier short-circuited, but will break the output circuits from the heads 8, 9, 10, and 11. The next positions of the switches still maintain the power amplifiers short-circuited, but complete the circuits from magnetic heads 13, 14, 15, and 16 in projector No. 2 to the preamplifiers 27, 28, 29, and 30, respectively. The next and last positions of the switches remove the short-circuits from the power amplifiers, while maintaining the magnetic heads in projector No. 2 connected to the preamplifiers.

Figure 3:
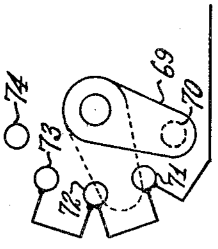
Fig. 3 is a detail view of another of the switches embodied in the invention.

These four switching steps may be further described by referring to Figs. 2 and 3, wherein it will be noted that the first positions of the switches will connect the swinger 69 with contact 71 to short-circuit its power amplifier, while the positioning of swinger 60 on contact 63 maintains the normal output circuit. When swinger 69 is moved to contact 72, the short-circuit is still maintained, but when swinger 60 is on contact 64 only, the output circuit from a reproduce head is disconnected. When swinger 69 is on contact 73, the power amplifier short-circuit is still maintained, while the positioning of swinger 60 on contact 66 makes the circuit from a head in the other projector. The last step is when swinger 69 is positioned on contact 74, removing the short-circuit, while swinger 60 maintains the new circuit through contact 67.

The switching circuits above described utilize the last two contacts of each of the switches 18 to 25, inclusive, for projector No. 2, while projector No. 1 utilizes the first two contacts of the switches. Thus, a switching circuit is provided wherein the switching operation is accomplished in the low level circuits and is not limited by the amount of additional gain required in the preamplifiers. The changeover system requires only a single knob, which operates the muting circuits as well as the changeover circuits. The above described switching system requires only four preamplifiers rather than eight, which are normally used in a magnetic head detecting system.

It is understood, of course, that when the changeover is made from projector No. 1 to projector No. 2, the reverse order of contacts is made, providing the same muting of the channels during the breaking and making of the pickup head circuits.

I claim:

1. A multiple signal source switching system for switching the outputs from one group of signal sources to another comprising a plurality of groups of signal sources, a plurality of preamplifiers sufficient for one group of said plurality of said signal sources, a plurality of the power amplifiers sufficient for one group of said plurality of said signal sources, electrical circuits interconnecting respective ones of said amplifiers and said signal sources, multiple switches in said circuits for simultaneously connecting any one of said groups of signal sources to said amplifiers, and simultaneously operated switches for short-circuiting the outputs of said preamplifiers and the inputs of said power amplifiers during the switching operation.

2. A multiple signal source switching system in accordance with claim 1 in which all of said switches are make-before-break switches.

3. A multiple channel sound reproducing system for multiple sound tracks on a motion picture film comprising a pair of picture projectors, a plurality of means for each projector to individually and simultaneously detect each of said sound tracks on said film, a corresponding plurality of preamplifiers and a corresponding plurality of power amplifiers connected in series for said plurality of said detecting means, electrical circuits interconnecting said amplifiers and said detecting means, and switching means in said electrical circuits connected between each plurality of detecting means for each projector and said preamplifiers for changing the output from the plurality of detecting means for one projector to the plurality of detecting means for the other projector.

4. A multiple channel sound reproducing system in accordance with claim 3 in which additional switching means are provided for simultaneously short-circuiting the outputs of said preamplifiers and the inputs of said power amplifiers during the switching operation from the plurality of detecting means for one projector to the plurality of detecting means for said other projector.

5. A multiple channel sound reproducing system in accordance with claim 3 in which said switching means has a plurality of fixed contacts, additional switches being provided for first short-circuiting the outputs of said preamplifiers and the inputs of said power amplifiers during the switching operation between said plurality of detecting means, and then removing said short circuits after said new plurality of detecting means has been connected to said preamplifiers.

6. A multiple channel sound reproducing system in accordance with claim 5 in which switches are provided with make-before-break contacts.

References Cited in the file of this patent

UNITED STATES PATENTS

| | | |
|---|---|---|
| 2,184,565 | Pesce | Dec. 26, 1939 |
| 2,676,272 | Byrd et al. | Apr. 20, 1954 |